UNITED STATES PATENT OFFICE.

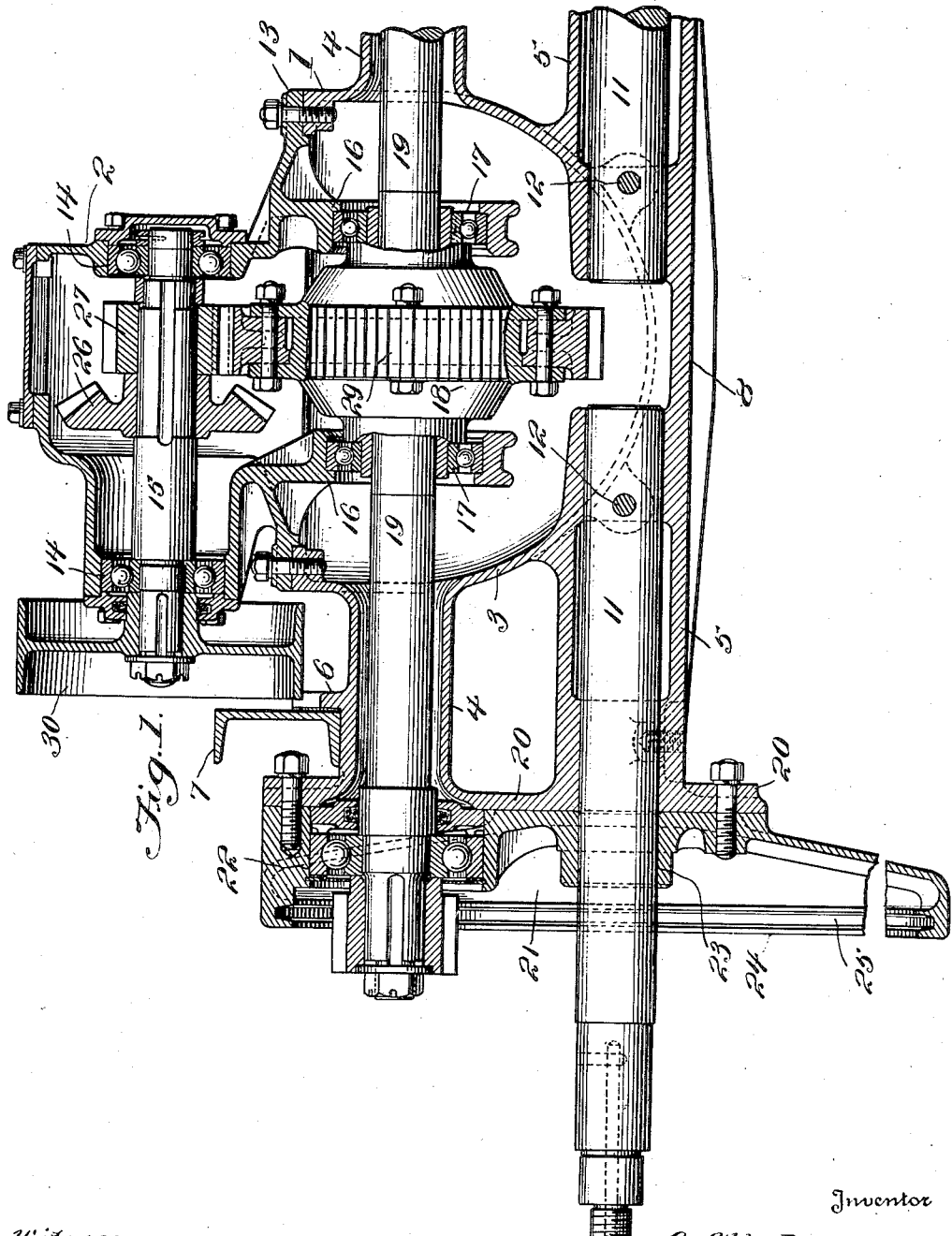

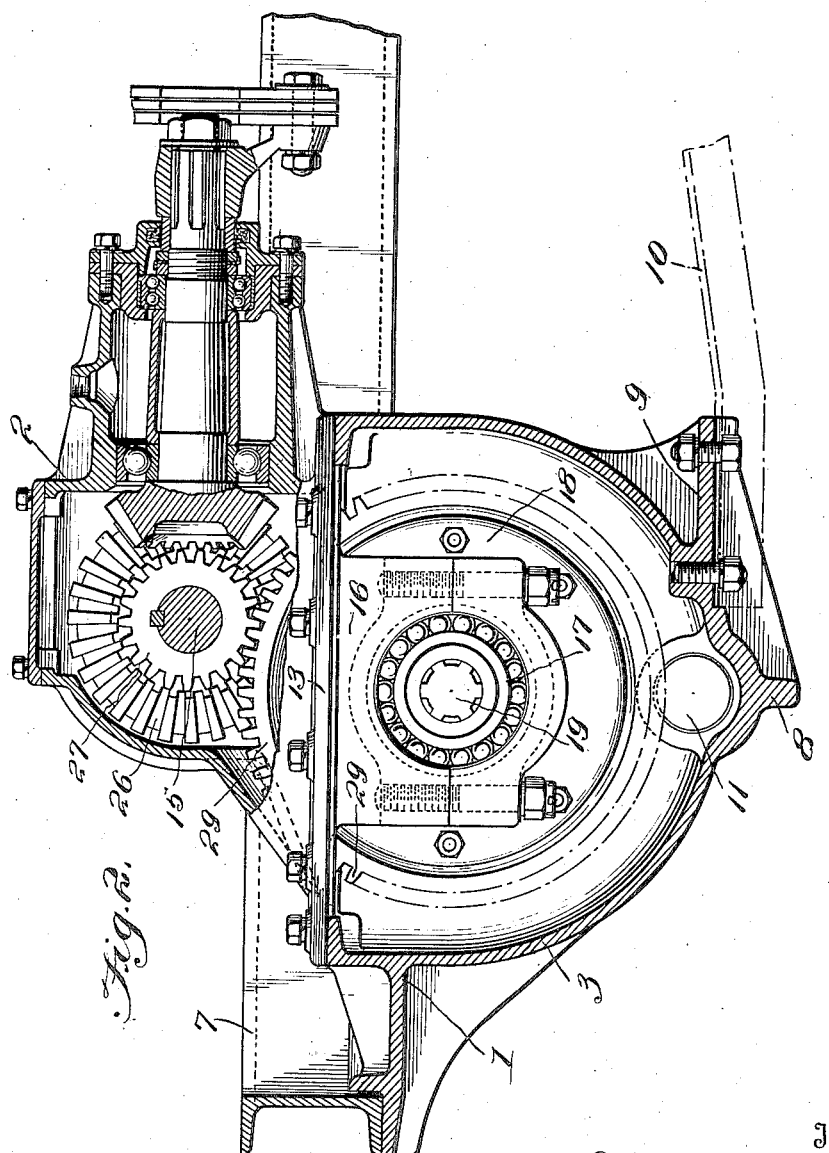

ALFONSO M. LEONI, OF PHILADELPHIA, PENNSYLVANIA, ASSIGNOR, BY MESNE ASSIGNMENTS, TO STEINMETZ ELECTRIC MOTOR CAR CORPORATION, OF BALTIMORE, MARYLAND, A CORPORATION OF MARYLAND.

REAR-AXLE ASSEMBLY.

1,385,082. Specification of Letters Patent. Patented July 19, 1921.

Application filed July 19, 1919. Serial No. 311,914.

*To all whom it may concern:*

Be it known that I, ALFONSO M. LEONI, a citizen of the United States, residing at Philadelphia, in the county of Philadelphia and State of Pennsylvania, have invented certain new and useful Improvements in Rear-Axle Assemblies, of which the following is a specification.

This invention relates to an improvement in rear axles for motor vehicles, wherein a unit formation is provided for the convenient assembling and disassembling of the parts.

The improved construction provides a housing made up of two principal parts, one such part being formed for the reception and mounting of the live and dead axles, and the other such part, carried by and removably secured to the first mentioned part, serving as a carrier for the differential and driving connections between such differential and power shafts.

The carrier section of the housing is provided with a counter shaft set at a square angle with the power shaft and operated thereby, the differential gearing being driven from such counter-shaft by a spur gearing, as distinguished from the usual bevel gearing for the purpose. Furthermore, this counter shaft is utilized as a brake shaft, having a brake band wheel or drum for the purpose.

The main, or body section of the housing is formed to receive the differential casing, and is provided with lateral sleeve extensions to support the live axles operated through the differential, and with lateral sleeve extensions in which the dead axles are secured. The ends of the body section are closed by plates formed to support the driving pinions on the live axles, and for correctly positioning the bearings for the live axles with respect to the axle center line, and also provided with a support for a dust-proof connection for the internal gear drive.

In the drawings:—

Figure 1 is a vertical central section through the assembly constructed in accordance with the invention; and Fig. 2 is a similar section taken at right angles to that of Fig. 1.

The invention is here shown as comprising a rear axle housing made up in two main parts, a body section 1 and a carrier section 2. The body section 1 has the usual centrally-arranged, semi-spherical, hollow bowl 3, open at the upper end to receive the carrier section 2. The bowl 3 is formed near the upper end with laterally-projecting sleeve extensions 4, to receive the live or driving axles, and is also formed at the extreme lower end with lateral sleeve extensions 5 to receive the dead or wheel carrying axles. The sleeve extensions 4 and 5, extend transversely of the vehicle frame and are of such lengths as to extend beyond the same, the sleeves 4 having integral lips 6, forming with the upper portions of such sleeves, a shouldered bearing for the frame bars 7. The dead axle sleeves 5 are formed at the lowest point of the body section of the housing, and the latter is preferably thickened and otherwise reinforced, as at 8, at this point. If desired this section 1 may be provided with integral extensions 9, to which brace-bars 10 secured to the vehicle frame, may be bolted for effective bracing. The sleeves 5 are preferably slightly tapered and the dead, or wheel carrying axles 11 are similarly tapered for a driving fit within said sleeves, pins 12 being used for additional securing if desired.

The carrier section 2 of the housing is provided with a base-section 13, adapted to conform to the upper open end of the body section 1, and to be removably bolted thereto as shown. The carrier section is hollow above the body section, and the side walls thereof provided to receive bearings 14, supporting a counter-shaft 15. The carrier section has depending spaced walls 16, adapted when the housing sections are assembled to be located within the bowl 3 of the body section of the housing, and these walls 16 support bearings 17, for the mounting of the differential gear case 18. The live or driving axles 19 telescope within the differential gear case, as is usual, and extend therefrom through the sleeve extensions 4, and beyond the same.

The sides of the body portion of the housing present an annular flange 20 beyond the open ends of the sleeves 4 and 5, and plates 21 are removably bolted to these flanges. Each plate 21 is formed in line with the live axle sleeve 4 with an annular wall bearing opening 22 to receive a bearing to support the outer end of the live axle. An opening 23 is also formed in the plate to permit passage therethrough of the dead axle. The plate also carries a ring member 24, formed with an internal groove 25 to receive a packing ring to bear on the flange of the wheel to exclude dust and dirt from the bearings.

The free ends of the live axles are provided with pinions for gearing drive connection with the wheels, and the plates 21 thus support the live or driving axles, properly position the bearings therefor with respect to the axle center line, and form a dust proof guard for the bearings.

The counter-shaft 15 is provided with a bevel gear 26, keyed thereon, which through suitable meshing gearing on the power shaft, serves to operate the counter shaft. A spur gear 27 is keyed on the counter shaft, in line with the differential gear case, and the latter is provided with a similar gear 29 in mesh with the gear 27. Through the arrangement described a spur-gearing connection is provided with the differential, as distinguished from the usual bevel gear drive, thus eliminating the necessity of providing for adjustment, taking care of the side thrust, and other objections of the bevel-gear type.

While the invention is here shown as a gear drive from the live axles, it is apparent that the essential details are not limited to a particular type of wheel drive, as other conventional types may be utilized and are contemplated.

The counter-shaft 15 is extended beyond the carrier section of the housing, and the extended portion is provided with a brake wheel or drum, as 30. The brake wheel in this arrangement is parallel to the length of the vehicle, and is thus conveniently located for brake control.

Having thus described the invention, what is claimed, is:—

1. A rear axle assembly comprising a two-part housing, one part being formed with lateral sleeve extensions to receive the driving and dead axles, plates secured to such part, bearings for the driving axles arranged in such plates, and rings carried by such plates to receive dust-guard strips for coöperation with the wheels.

2. A rear axle assembly comprising a housing having lower sleeve portions to receive dead axles, upper sleeve portions to receive live axles, a second housing adapted to be removably secured to the upper end of the first housing, and a differential supported wholly by said second housing and operating within the first housing.

3. A rear axle assembly comprising a main housing having a bowl portion and upper and lower sleeve extensions therefrom, an auxiliary housing arranged to be removably secured to the main housing, a differential carried by the auxiliary housing and arranged wholly within the main housing, and a spur-gear drive for said differential arranged in said auxiliary housing.

4. A rear axle assembly, comprising a main housing having a bowl portion with upper and lower sleeve members extending therefrom to receive live and dead axles, an auxiliary housing to be removably secured to the main housing and having bearing extensions projecting within the bowl portion of the main housing to receive the inner ends of the live axles, a differential supported by and between said bearings, and a driving means for said differential supported in the auxiliary housing and including a spur gear.

5. A rear axle assembly including a main housing supporting live and dead axles, an auxiliary housing removably secured to the main housing and supporting a differential and bearings for such live axles, driving means for the differential supported in the auxiliary housing, and a counter shaft supported in such auxiliary housing and operated through such driving means.

In testimony whereof I affix my signature.

ALFONSO M. LEONI.